Jan. 13, 1925  1,522,888

J. T. JOHNSON

MEANS AND METHOD FOR UNITING TOOLS TO HANDLE SHANKS

Filed July 12, 1924

INVENTOR.
John Theodore Johnson,
BY
Frautzef and Richards
ATTORNEYS.

Patented Jan. 13, 1925.

1,522,888

UNITED STATES PATENT OFFICE.

JOHN THEODORE JOHNSON, OF NEWARK, NEW JERSEY, ASSIGNOR TO BERNARD WIGDER, OF NEWARK, NEW JERSEY.

MEANS AND METHOD FOR UNITING TOOLS TO HANDLE SHANKS.

Application filed July 12, 1924. Serial No. 725,657.

*To all whom it may concern:*

Be it known that I, JOHN THEODORE JOHNSON, a citizen of the United States, residing at Newark, in the county of Essex and State of New Jersey, have invented certain new and useful Improvements in Means and Methods for Uniting Tools to Handle Shanks; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in a method and means for uniting tools to handle shanks; and the invention has reference, more particularly, to a novel method and means for rigidly and securely uniting a tool with a handle shank therefor without drawing the temper of the tool, without bending or distorting the tool, and so as to ultimately provide an integral handle shank positively interlocked with the butt of the tool so that the latter is held rigidly against loosening.

The invention has for its principal object to provide a novel construction of metallic shank having a means to envelop and interlock with the butt of a tool element, the shank when assembled with the tool being subject to the process of electric welding whereby the same is welded or wrought into an integral or substantially one piece construction; the invention has for a further object to provide a method of assembling and securing such a tool shank in the described enveloped and interlocked relation to the butt of the tool element by electric welding, in such manner, that, while the shank may be heated, at a desired point, sufficiently to produce a weld of adjoining and contacting portions thereof, yet the tool element itself will not be subjected during such operation to such degree of heat as would be likely to draw the temper of the tool or soften or anneal the butt so that the same would be likely to easily be bent or distorted from desired normal alignment or shape.

Other objects of this invention, not at this time more particularly enumerated, will be clearly understood from the following detailed description of the same.

With the various objects of this invention in view the same consists, primarily, in the novel means and method of uniting handle shanks to tool elements; and, the invention consists, furthermore, in the novel arrangements and combinations of the various devices and parts, as well as in the details of the construction of said parts, all of which will be more fully described in the following specification, and then finally embodied in the claims appended thereto, The invention is clearly illustrated in the accompanying drawings, in which:—

Figure 4:
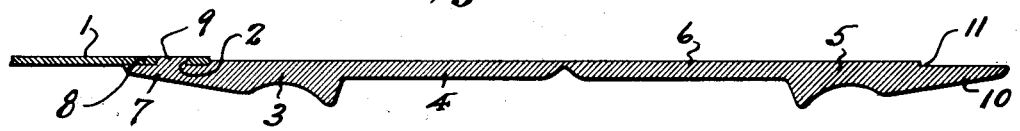
Figure 5:
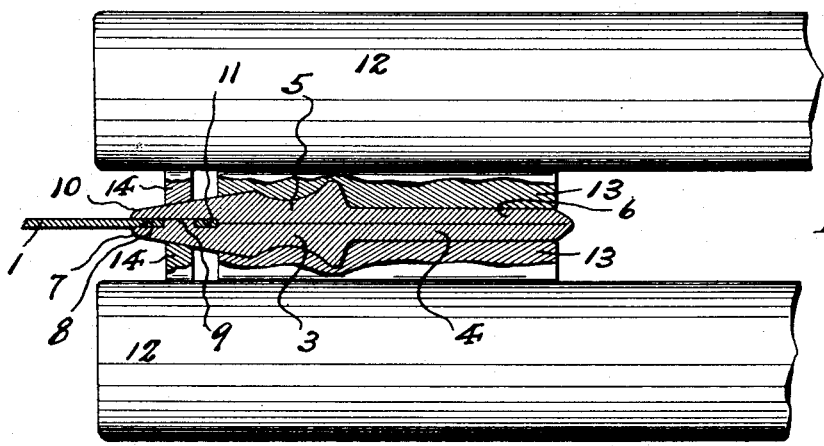
Figure 6:
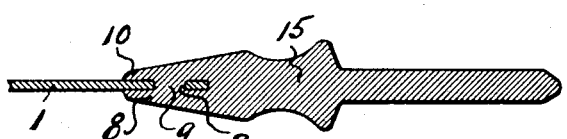

Figure 4 is a longitudinal section, drawn on an enlarged scale, and showing the first step in assembling the file and handle shank; Figure 5 is a similar longitudinal section, showing the handle shank assembled with the file, and ready for the electric welding operations whereby the handle shank is operatively united to the file; and Figure 6 is a similar longitudinal section, showing the handle shank welded into a substantially integral mass and operatively united in assembled relation to the file.

Similar characters of reference are employed in all of the hereinabove described views, to indicate corresponding parts.

Referring to said drawings, the reference character 1 indicates a file body, such, for example, as a manicure file. While I have selected the manicure file as illustrative of a type of tool usually provided with a handle shank, it will be understood that I do not limit this invention to files, but intend it to apply to any type of tool adapted to receive the application thereto of a handle shank and to which it is desirable to attach such handle shank, and especially to highly tempered tools falling within the indicated class.

The file or other tool body is provided, adjacent to its butt or rear end with an opening or slot 2 of suitable conformation.

The novel handle shank, made according to and embodying the principles of this invention, is produced by forging a suitable metal into a blank B, to provide the handle shank in halves, which when folded upon itself longitudinally preforms a complete handle shank element of desired shape and design. This blank B comprises a shank section 3 having a rearwardly extending tang section 4, and a shank section 5 having a like rearwardly extending tang section 6. The shank section 3 is provided at its forward end with a side flange 7 having at its inner face a half-mortise or socket 8 corresponding in depth to one-half the thickness of the file or other tool body to which the handle shank is to be united. Said side flange 7 is provided on its inner or half-mortised face with a boss or projection 9 corresponding in position and shape to the slot or opening 2 provided in the butt of the file or other tool body 1, the same being of a height slightly in excess of the thickness of the file or other tool body 1. The shank section 5 is provided at its forward end with a side flange 10 having at its inner face a half-mortise or socket 11 corresponding in depth to one-half of the thickness of the file or other tool body to which the handle shank is to be united.

While I have shown the two shank sections 3 and 5 joined together end to end by their respective tang sections 4 and 6, so as to form a single blank B, and although I prefer such arrangement, I do not limit myself thereto, since, if desired, the respective shank sections with their respective tang sections may be separately forged and subsequently assembled together with the file or other tool body.

The blank B is initially assembled with the file or other tool body 1 in the following manner:—

The butt or rear end of the file or other tool body 1 is first engaged in the half-mortise or socket 8 of the shank section 3, so that the boss or projection 9 is entered in and projects through the slot or opening 2 in the butt of the file or other tool body, as shown in Figure 4. After the parts are thus arranged, I prefer to strike the end or outer face of the boss or projection 9 a smart blow, so as to slightly rivet the same over the margins of the slot or opening 2 in the butt of the file or other tool body, although it is not essential that this be done. Having thus assembled the file or other tool body 1 with the shank section 3, the shank section 5 is turned upwardly and then over upon the shank section 3 so as to register together the two sections 3 and 5 and their tang sections 4 and 6, with the half-mortise or socket 11 of the shank section 5 engaged over and in embracing relation to the file or other tool body 1, and so that the inner face of the side flange 10 will contact with the end or outer face of the boss or projection 9, as shown in Figure 5, thus completing the initial assembling operations.

The next step comprises one or more electric welding operations, whereby the mutually engaged shank and tang sections are welded into an integral mass, and the projection or boss 9 is welded to the opposed side flange 10 of the shank section 5. To this end suitable electrode supports 12 of any desired type of electric welding machine are provided with electrode members 13 suitably shaped to operatively engage the shank sections 3 and 5 and their tang sections 4 and 6, so that when an electrical current is passed through the parts, sufficient pressure and heat is generated to cause the said parts to be welded together at points in the rear of the butt of said file or other tool body. Spot welding electrode members 14 are provided, which are adapted to engage the side flanges of the shank sections at points in alignment with the projection or boss 9, so that sufficient heat and pressure is generated to weld the side flange 10 to the projection or boss 9.

While I have shown in Figure 5 of the drawings the electrode supports or carriers 12 equipped to perform both of the above mentioned welding operations at one time, this is not essential, and in fact, in practice, I prefer to perform the shank and tang body welding as a separate operation, and then subsequently perform the spot welding operation whereby the side flange 10 and projection or boss 9 are united, or vice versa, for the reason that less heat is generated and consequently there is no likelihood of annealing or softening the butt of the file or other tool body whereby the temper of the latter is drawn. The main advantage of the projection or boss 9, arranged to pass through the body of the file or other tool and directly engage the opposite side flange 10, is that the heat generated during the welding operation is substantially confined to such engaged parts, and is not conducted to the file or tool body 1 to an extent or degree likely to draw the temper or unduly soften the butt of the latter.

Figure 1:
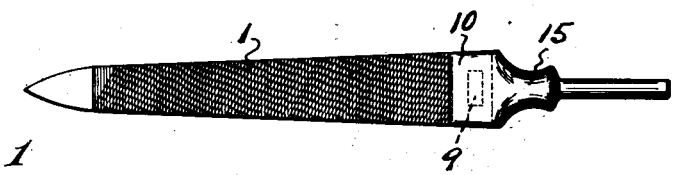
Figure 1 is a plan view of a manicure file provided with the novel handle shank made according to and embodying the principles of this invention, and applied to the file body by the novel method in accordance with this invention.
Figure 2:
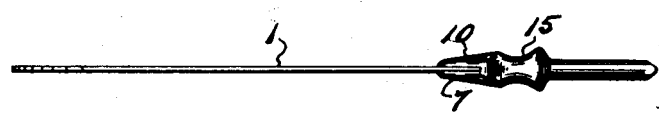
Figure 2 is a side elevation or edge view of the same.
Figure 3:
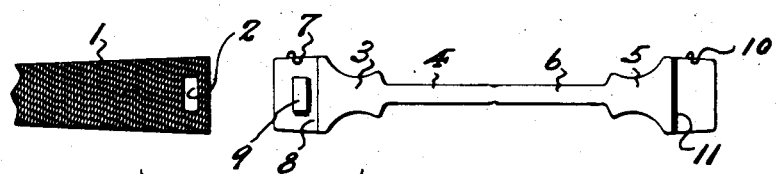
Figure 3 is a plan view of a portion of the manicure file and the blank from which the novel handle shank is formed before the same are assembled together.

Upon completion of the welding operations, as above described it will be seen, as illustrated in Figures 1, 2 and 6 of the drawings, that the handle shank with its tang is united into a substantially integral structure 15, while at the same time it is firmly and positively united to the butt of the file or other tool body, so that the latter is strongly and durably secured against separation from the handle shank. Further advantages of the above described method and resultant structure are that, the file or other tool body is not only initially aligned but is subsequently maintained in straight and true axial alignment with the handle shank, and since the file or other tool body is not softened or its temper drawn at the butt, there is no resultant tendency of the same to bend out of such desired axial alignment, or to become otherwise distorted in use.

Having thus described my present invention, I claim:—

1. The combination with a tool butt provided with an opening therein, of a handle shank mortised to receive said tool butt, a boss integral with one side portion of said handle shank adapted to extend through said opening of said tool butt to contact with the opposite side portion of said handle shank, and said contacting surfaces of said boss and opposite side portion of said handle being united by a weld.

2. The combination with a tool butt provided with an opening therein, of a handle shank initially provided in separable halves mortised to receive said tool butt, one half of said handle shank having a boss extending through said opening of the tool butt to contact with the opposite half of said handle shank, the contacting surfaces of the separable halves of said handle shank and the contacting surfaces of said boss and opposed half of said handle shank being united by welds.

3. The combination with a tool butt provided with an opening therein, of a handle shank having opposed side flanges mortised at their inner faces to receive said tool butt therebetween, one of said side flanges having a boss projecting from its inner face to extend through said opening of said tool butt into contact with the inner face of the opposite side flange, and means uniting the contacting portions of said boss and opposite side flange against separation.

4. The combination with a tool butt provided with an opening therein, of a handle shank having opposed side flanges mortised at their inner faces to receive said tool butt therebetween, one of said side flanges having a boss projecting from its inner face to extend through said opening of said tool butt into contact with the inner face of the opposite side flange, and the contacting surfaces of said boss and opposite side flange being united by a weld.

5. The combination with a tool butt provided with an opening therein, of a handle shank initially provided in opposed separable halves, each shank half having a side flange mortised at its inner face to engage over one side of said tool butt disposed therebetween, one of said side flanges having a boss projecting from its inner face to extend through said opening of said tool butt into contact with the inner face of the opposite side flange, and the contacting surfaces of said shank halves and the contacting surfaces of said boss and opposite side flange being united by welds.

6. A method of forming a handle shank and uniting the same to a tool body comprising, the provision in the butt of said tool body of an opening, forming a handle shank in separable halves, providing each half with a mortise socket to receive and engage over the tool butt, providing the inner face of the mortised socket of one half with a projection adapted to extend through said opening in said tool butt, registering the shank halves together with their inner faces contacting and with the face of said projection and the side of the opposite said mortised socket contacting, and then electrically welding said contacting portions together.

In testimony, that I claim the invention set forth above I have hereunto set my hand this 17th day of June, 1924.

JOHN THEODORE JOHNSON.

Witnesses:
GEORGE D. RICHARDS,
BERNARD WIGDER.